(12) United States Patent
Korte et al.

(10) Patent No.: US 8,118,092 B2
(45) Date of Patent: Feb. 21, 2012

(54) SWELLING DELAY COVER FOR A PACKER

(75) Inventors: James R. Korte, Katy, TX (US); Kent A. Evans, Houston, TX (US); Dustin D. Ellis, Richmond, TX (US); John J. Thurston, Houston, TX (US); Anthony P. Foster, Katy, TX (US); Steve Rosenblatt, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/561,035

(22) Filed: Sep. 16, 2009

(65) Prior Publication Data

US 2010/0025035 A1 Feb. 4, 2010

Related U.S. Application Data

(62) Division of application No. 12/185,208, filed on Aug. 4, 2008, now Pat. No. 7,681,653.

(51) Int. Cl.
*E21B 33/12* (2006.01)

(52) U.S. Cl. ............... 166/179; 166/387; 166/272.1; 277/323; 277/333; 277/934

(58) Field of Classification Search ............ 166/285, 166/387, 187, 378, 380; 277/316, 323, 333, 277/934
See application file for complete search history.

(56) References Cited

U.S. PATENT DOCUMENTS

| | | | |
|---|---|---|---|
| 2,849,070 A | 8/1958 | Maly | |
| 2,945,941 A | 7/1960 | Kalish | |
| 3,918,523 A * | 11/1975 | Stuber | 166/285 |
| 4,862,967 A * | 9/1989 | Harris | 166/387 |
| 6,932,159 B2 | 8/2005 | Hovem | |
| 7,013,979 B2 | 3/2006 | Richard | |
| 7,143,832 B2 | 12/2006 | Freyer | |
| 7,387,158 B2 | 6/2008 | Murray et al. | |
| 7,392,841 B2 | 7/2008 | Murray et al. | |
| 7,441,596 B2 | 10/2008 | Wood et al. | |
| 7,452,161 B2 | 11/2008 | Freyer et al. | |
| 7,467,664 B2 | 12/2008 | Cochran et al. | |
| 7,472,757 B2 | 1/2009 | Freyer | |

(Continued)

OTHER PUBLICATIONS

Kleverlaan, Martjin, et al., "Deployment of Swelling Elastomer Packers in Shell E & P", SPE/IADC 92346, Feb. 1-5, 2005.

(Continued)

*Primary Examiner* — Jennifer H Gay
*Assistant Examiner* — Yong-Suk Ro
(74) *Attorney, Agent, or Firm* — Steve Rosenblatt

(57) ABSTRACT

A swelling packer is covered with a material that is preferably in a tubular form and slipped over the swelling element to be shrink fit with applied heat. The material is formulated to break down at temperatures slightly below the expected downhole temperatures so that ideally the packer has about 48 hours of swelling delay which is normally a time period long enough to allow it to be properly located without it swelling so much as to cause it to be damaged by running in. Various polymers can be used to make an imperious covering for run in that on the way starts to break down. Ideally the material for the cover disappears about the time of sealing or shortly thereafter.

18 Claims, 2 Drawing Sheets

U.S. PATENT DOCUMENTS

| | | | |
|---|---|---|---|
| 2003/0037932 A1* | 2/2003 | Guillory et al. | 166/387 |
| 2004/0226724 A1* | 11/2004 | Hirth et al. | 166/387 |
| 2005/0199401 A1* | 9/2005 | Patel et al. | 166/387 |
| 2006/0272806 A1* | 12/2006 | Wilkie et al. | 166/192 |
| 2007/0151723 A1 | 7/2007 | Freyer | |
| 2009/0178800 A1* | 7/2009 | Korte et al. | 166/187 |

OTHER PUBLICATIONS

Freyer, Rune, et al., "Swellling Packer for Zonal Isolation in Open Hole Screen Completions", SPE 78312, Oct. 1-5, 2002.

Aboukshem, Ali A., et al., "Successful Application of Swell Packer Technology to Shut-off Water Production in Horizontal Wells—Case Studies from Onshore Abu Dhabi", SPE 117906, Nov. 1-8, 2008.

Keshka, Ashraf, et al., "Practical Uses of Swellable Packer Technology to Reduce Water Cut: Case Studies from the Middle East and Other Areas", SPE 108613, Sep. 1-10, 2007.

Yakeley, S., et al., "Swellable Packers for Well Fracturing and Stimulation", SPE 110621, Nov. 1-7, 2007.

Kennedy, G., et al., "The Use of Swell Packers as a Replacement and Alternative to Cementing", SPE 95713, Oct. 1-4, 2005.

* cited by examiner

SWELLING DELAY COVER FOR A PACKER

PRIORITY INFORMATION

This application is a divisional application claiming priority from U.S. patent application Ser. No. 12/185,208, filed on Aug. 4, 2008.

FIELD OF THE INVENTION

The field of this invention is packers that swell and more particularly outer coverings that delay their swelling to allow time for proper placement in the wellbore.

BACKGROUND OF THE INVENTION

Packers are used downhole for isolating zones in a wellbore. There are several styles available. Some of the more established designs feature a hydraulically or mechanically set design involving one or more sets of slips that are ramped out for anchoring the packer body while the sealing element is compressed to extend radially to the surrounding tubular with the slips holding the set position. Another style that has been used is the inflatable which has been run into casing, through tubing and in open hole applications. In this design the element has a fixed end and a movable end so that the fluid that inflates the element causes it to get larger radially for sealing contact while shrinking longitudinally. A system of valves retains the charging fluid and prevents overpressure of the element. Other designs have a sealing element on the outside of the mandrel and use radial expansion from within the mandrel. Some designs more recently have started using materials that swell in response to exposure to fluids already in the wellbore or added later on. Other designs have used shape memory materials to take advantage of the ability of such materials to revert to different shapes when raised above the transition temperature. Shape memory alloys are selected for the sealing element or other components such as springs that act on the slips or sealing element when the packer is set.

Among the swelling packers there continues to be a problem with delay of swelling long enough to allow the swelling packer to be properly positioned before it has swollen so much that it cannot be advanced to the proper location because it has already swollen too much. One solution that has been tried is to put an outer layer of a material that swells less than the core material and regulate the rate that well fluids diffuse through the outer layer before they can reach the core that swells at a significantly faster rate. This design is illustrated in U.S. Pat. No. 7,143,832. Some packers feed the fluid for swelling through the tubing instead of the well annulus where the packer is set. These designs also have a cover on the exterior that serves as the sealing component. There is no active external force that compresses the swelling element that ultimately drives the surrounding element into sealing contact in the wellbore. These designs are shown in U.S. Pat. Nos. 2,849,070 and 2,945,941. More recently in November 2007, the inventors of the present invention invented a coating for a swelling element packer with a resin with hardener fiberglass material known as Bondo® Product No. 402 made by the Bondo Corporation a subsidiary of 3M Corporation that is available at Wal-Mart®, a nationwide and international chain of retail general stores. This product is a fiberglass resin that is mixed with a hardener and was brushed on without the fiberglass mat material as a test of whether it would delay swelling. It was allowed to air dry before running the packer into the well. This technique was labor intensive and the fiberglass epoxy resin had a very short pot life making the consistency of the coating variable and while having some benefit in retarding swelling the nature of the application process made it difficult to determine if there were beneficial results even after multiple runs with such a coating. Other packers have used a cover on a compression set sealing element. In this application the packer sealing element was selected for resistance to hydrogen sulfide and the material chosen also had the characteristic of swelling in oil based mud. The cover was placed over the sealing element exterior and when the destination for the packer was reached the sealing element was longitudinally compressed with the intent that the cover would be mechanically compromised as the sealing element was forced out. The fact that the element swelled was a downside in a decision controlled by tolerance to corrosive materials in the well and played no part in the actual sealing process. This type of packer is illustrated in U.S. Pat. No. 4,862,967.

The present invention seeks to make a swelling packer operate in high temperature applications by covering it externally with an impervious cover to allow sufficient time to get the packer to the desired position before it swells to a point where it can not be advanced. The coating is preferably formed into a tubular shape and shrink fit to the swelling element. On the way down to the desired location the combination of the well temperature and the well fluids attack the cover to the point that ideally when the packer is placed at the desired location in the well the cover has been attacked sufficiently for it to have to have dissolved or have pieces break off or will break down in a matter of a few hours or days so that the sealing due to swelling results in contact of the core material with the surrounding tubular or the wellbore wall in open hole. The material for the cover is expected to lose its integrity as opposed to remain intact and simply control well fluid diffusion through it. The cover, when applied is impervious and its surrounding fluid environment causes it to fail by several potential mechanisms. These and other aspects of the present invention will be more apparent to those skilled in the art from the description of the preferred embodiment described below and the associated drawings, while recognizing that the full scope of the invention is determined by the claims.

SUMMARY OF THE INVENTION

A swelling packer is covered with a material that is preferably in a tubular form and slipped over the swelling element to be shrink fit with applied heat. The material is formulated to break down at temperatures slightly below the expected downhole temperatures so that ideally the packer has about 48 hours of swelling delay which is normally a time period long enough to allow it to be properly located without it swelling so much as to cause it to be damaged by running in. Various polymers can be used to make an imperious covering for run in that on the way starts to break down. Ideally the material for the cover disappears about the time of sealing or shortly thereafter.

DETAILED DESCRIPTION OF THE PREFERRED EMBODIMENT

Figure 1:
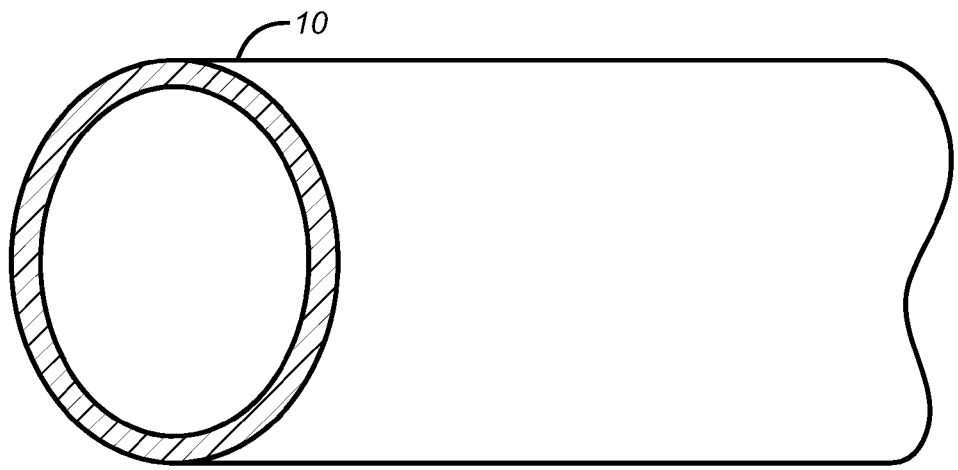
FIG. 1 is a view of a tubular sleeve cover before it is applied to a swelling element.
Figure 2:
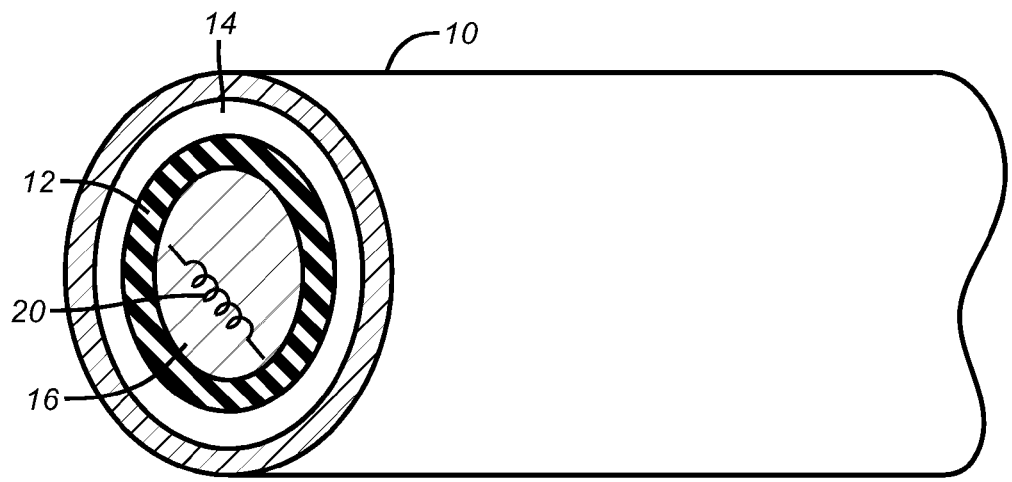
FIG. 2 is the view of FIG. 1 showing the tube cover put over the swelling element and heat being applied.
Figure 2:
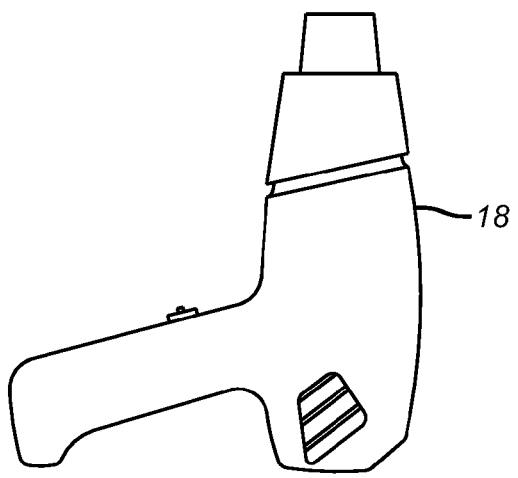

FIG. 1 illustrates a tube shape 10 that is long enough to cover a swelling element 12 leaving an air gap 14 that allows rapid deployment. The swelling element 12, shown in FIG. 2, is preferably rubber mounted to a mandrel 16. It sets by radial swelling without longitudinal compression. Heat source 18 can be a hand held unit or an oven that accepts the assembly. Application of heat reduces the diameter of the cover material 10 so that it snugly fits to the element 12. The ends of the element 12 are also sealed with the tube shape 10 as a result of the heating.

The cover 10 can also be a film formed on the element 12 or applied to it as a sheet using a variety of wrapping techniques whose goal is to externally cover the swelling element and to delay its exposure to well fluids. This delay allows time to deliver the assembly to the desired depth in the well without enough swelling that would potentially damage the element 12 while it is still being advanced into the wellbore.

Figure 3:
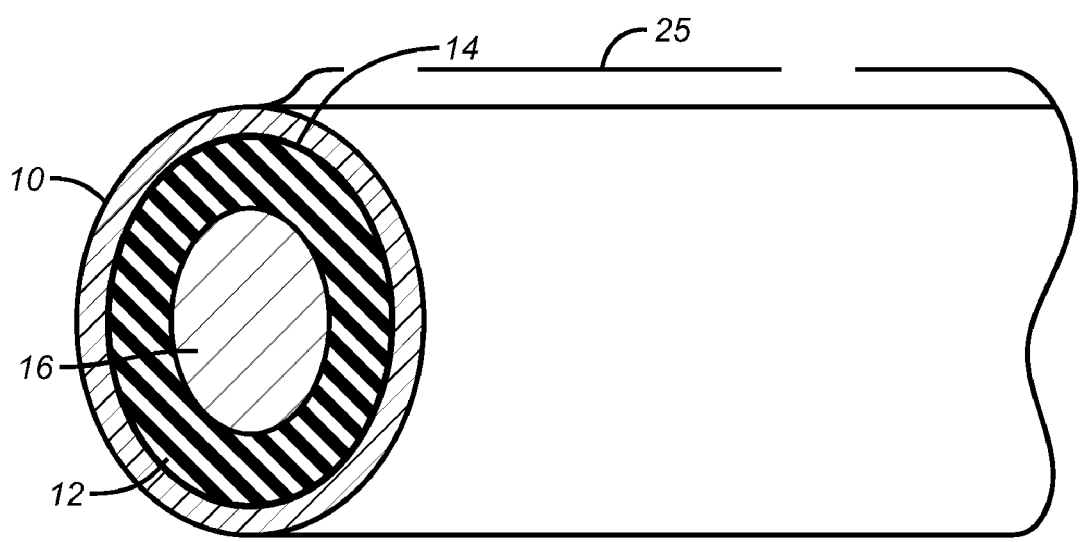
FIG. 3 is the view of FIG. 2 showing the tubular cover shrunk over the swelling element and in condition for running the packer in the hole.

The goal is to have a tight fitting cover 10, as shown in FIG. 3, that is impervious to well fluids but that is also attacked by the combination or one of well temperature and well fluid compositions. Normally a period of about 48 hours is long enough to get the packer into position where swelling of the element 12 creates a seal. The material for the cover 10 is preferably sensitive to temperatures about 10-30 degrees F. lower than the anticipated well fluid temperatures. As a result the cover 10 begins disintegrating as early as during the packer delivery phase. The objective is to use the element 12 swelling for contact in the wellbore to an open hole or a surrounding tubular. Alternatively to fully relying on well fluid temperatures to attack the cover 10 the packer can carry a heat source 20 to initiate or hasten the failure of the cover 10 along with a trigger actuated from the surface such as by tubing or hydrostatic pressure or wired or other signal transmission mechanism.

As opposed to the concept of diffusion, the cover 10 is intended to remain impervious until portions of it are either melted or dissolved away to gradually expose the element 12 directly to well fluids. Pieces may also simply break off due to exposure to temperature or specific fluids in the well. The cover 10 especially in the shrink fit tube variation goes on fast and is cost effective to manufacture and apply. It has no issues of shelf or pot life as with multi-component epoxies with hardeners and is far less labor intensive even when manually rolled off a roll in sheet form and over the element 12 in a single or multiple layers that can partially or totally overlap. The film can be spirally wound with overlaps simply fusing together when heat is applied to shrink the cover onto the element 12. The preferred cover materials are poly tetra fluoroethylene (PTFE), poly ethylene teraphthalate polyester (PET), poly vinyl alcohol (PVA), fluorinated ethylene propylene (FEP), per fluoro alkoxy (PFA) or ethylene tetra fluoro ethylene (ETFE) or combinations thereof. The preferred element 12 material is rubber.

The cover 10 can be a single or multiple layer tube. If it is in multiple layers it is preferred that the thermal sensitivities to heat increases as the layers get closer to the element 12. It is not necessary that the layers fuse together or that they seal tightly with respect to each other. The multi-layer version of the cover 10 provides additional protection against mechanical damage during run in and can provide a staged response to thermal exposure as the outermost layers will degrade earlier and at lower temperatures. The layers can be similar in chemical structure with some variation in composition to tailor the desired properties so that for example an outer layer will begin degrading at 350 degrees F. while the layer under it will be good for about 400 degrees F. The layers can be shrink fit individually or together to the element 12.

As a result, a swelling packer is created with a thin outer cover which delays swelling to allow proper positioning. The process to apply the cover is simple and cost effective preferably using a tube shape and slipping it on and heating to shrink fit it to the underlying swelling element. By the time the packer arrives to where it needs to seal the cover is breaking down or already broken down by either melting or simply being chemically attacked so that the swelling can take place or continue and a seal is obtained at the desired location in a matter of a few days or weeks later. The film thickness can be adapted to the time needed for the delay of substantial swelling and the expected well temperatures. Field application of the covers or different properties or thickness without skilled labor or complex tools is possible. The cover is cost effective and there is little to no waste material. Cover thicknesses of about 5-20 thousands of an inch are contemplated. Optionally, the cover 10 can be applied to the element 12 and then the two can be mounted to the mandrel 16 at a later time. The cover, in that case, can cover only the exterior surfaces of the element 12 or/and the interior bore as well. Other options exist for using the film cover 10 in conjunction with another cover 25 made of fiberglass resin with hardener, described above, or with alternative coatings to the fiberglass resin that degrade with exposure to temperatures and fluids in the wellbore. In one variation the fiberglass resin cover 25 can be applied to the element 12 initially and then a tubular cover 10 can be slipped over the resin coating for additional protection during run in. The coating 10 can be in one or more layers, described above, and is preferably shrink fit. Alternatively, the fiberglass resin or equivalent cover 25 can be applied over a cover 10 that has previously been shrink fit to the element 12 as shown in FIG. 3. In either arrangement the outer layer is degraded first generally at a lower temperature and the inner layer is degraded on further exposure over time to a higher temperature that reaches it when the outer layer degrades. While shrink fitting the cover 10 is preferred, it can be mounted in other ways and closed off, regardless whether it is the inner or outer covering to the element 12.

The above description is illustrative of the preferred embodiment and many modifications may be made by those skilled in the art without departing from the invention whose scope is to be determined from the literal and equivalent scope of the claims below:

We claim:

1. A downhole packer method of use, comprising:
   running in a packer with a film cover on a swelling element mounted on a mandrel;
   exposing said cover to well fluids when running said mandrel downhole;
   using said exposing to undermine the integrity of said cover;
   allowing said element to swell without longitudinal compression from access of well fluids through the undermined cover;
   sealing downhole with said swelling element;
   applying an additional cover made from a resin and hardener combination to said swelling element mounted on a mandrel;
   locating said additional cover either below or outside of said film cover;
   configuring said film and additional covers to degrade at different temperatures.

2. The method of claim 1, comprising:
   using heat for said joining.

3. The method of claim 2, comprising:
shrinking the dimensions of said tubular shape by using said heat.

4. The method of claim 3, comprising:
making said cover from a material attacked by well fluids.

5. The method of claim 4, comprising:
making said cover of a material impervious to well fluid for a predetermined time.

6. The method of claim 5, comprising:
providing said material with a property of melting or dissolving at temperatures of more than 10 degrees F. lower than the well temperature at the desired setting location downhole.

7. The method of claim 6, comprising:
making said cover from a polymer selected from a group consisting of one or more Polytetrafluoroethylene (PTFE), Polyethylene terephthalate (PET), Polyvinyl alcohol (PVA), Fluorinated ethylene propylene (FEP), Perfluoroalkoxy copolymer resin (PFA) and Ethylene-tetrafluoroethylene (ETFE) polymer families.

8. The method of claim 5, comprising:
making said material melt or dissolve with exposure to well fluids for a predetermined time.

9. The method of claim 1, comprising:
applying said film cover to said swelling element before mounting the swelling element to said mandrel.

10. The method of claim 1, comprising:
applying said film cover to said swelling element after the swelling element is mounted to said mandrel.

11. The method of claim 1, comprising:
applying heat to said film cover from a heat source supported by said mandrel.

12. The method of claim 11, comprising:
triggering said applying heat from a surface signal.

13. A downhole packer method of use, comprising:
running in a packer with a cover made from a resin and hardener combination to a-swelling element mounted on a mandrel;
exposing said cover to well fluids when running said mandrel downhole;
using said exposing to undermine the integrity of said cover;
allowing said element to swell without longitudinal compression from access of well fluids through the undermined cover;
sealing downhole with said swelling element.

14. The method of claim 13, comprising:
using a fiberglass resin with hardener for said cover.

15. The method of claim 14, comprising:
using a resin with hardener fiberglass material in said cover.

16. A downhole packer method of use, comprising:
running in a packer with a film cover on a swelling element mounted on a mandrel;
exposing said cover to well fluids when running said mandrel downhole;
using said exposing to undermine the integrity of said cover;
allowing said element to swell without longitudinal compression from access of well fluids through the undermined cover;
sealing downhole with said swelling element;
making said cover in multiple layers that degrade at different temperatures.

17. The method of claim 16, comprising:
applying said layers to said sealing element sequentially and shrink fitting each layer or all at once and shrink fitting all layers.

18. The method of claim 16, comprising:
providing an inner layer that degrades at a higher temperature than another layer covering said inner layer.

* * * * *